United States Patent
Moffett

(10) Patent No.: US 6,780,330 B2
(45) Date of Patent: Aug. 24, 2004

(54) REMOVAL OF BIOMATERIALS FROM AQUEOUS STREAMS

(75) Inventor: Robert Harvey Moffett, Landenberg, PA (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 168 days.

(21) Appl. No.: 09/802,712

(22) Filed: Mar. 9, 2001

(65) Prior Publication Data

US 2003/0015476 A1 Jan. 23, 2003

(51) Int. Cl.$^7$ .................................................. C02F 1/56
(52) U.S. Cl. ...................... 210/725; 210/666; 210/727; 210/905; 210/734
(58) Field of Search ................................. 210/705, 710, 210/725, 727, 728, 730, 731, 734, 735, 736, 905, 665–667

(56) References Cited

U.S. PATENT DOCUMENTS

| | | | |
|---|---|---|---|
| 3,622,510 A | * 11/1971 | Felicetta et al. ............. 210/905 |
| 4,013,555 A | * 3/1977 | Davis .......................... 210/725 |
| 4,790,943 A | * 12/1988 | Dunn et al. .................. 210/705 |
| 4,923,629 A | 5/1990 | Hasegawa et al. |
| 4,927,498 A | 5/1990 | Rushmere |
| 4,933,087 A | 6/1990 | Markham et al. |
| 4,954,220 A | 9/1990 | Rushmere |
| 4,966,713 A | * 10/1990 | Keys et al. .................. 210/705 |
| 5,127,994 A | 7/1992 | Johansson |
| 5,174,903 A | 12/1992 | Miller |
| 5,178,770 A | 1/1993 | Chung |
| 5,204,452 A | 4/1993 | Dingilian et al. |
| 5,269,939 A | 12/1993 | Laurent et al. |
| 5,278,284 A | 1/1994 | Lusk et al. |
| 5,393,435 A | 2/1995 | Deans et al. |
| 5,413,720 A | * 5/1995 | Miller ......................... 210/725 |
| 5,482,693 A | 1/1996 | Rushmere et al. |
| 5,496,440 A | 3/1996 | Carre et al. |
| 5,496,572 A | 3/1996 | Rudden |
| 5,569,385 A | 10/1996 | O'Carroll et al. |
| 5,597,490 A | * 1/1997 | Chung et al. ............... 210/727 |
| 5,603,805 A | 2/1997 | Andersson et al. |
| 5,626,721 A | 5/1997 | Rushmere et al. |
| 5,653,886 A | 8/1997 | Kerr et al. |
| 5,658,462 A | 8/1997 | Hopkins et al. |
| 5,667,697 A | 9/1997 | Salmen et al. |
| 5,695,647 A | 12/1997 | Carbonell et al. |
| 5,725,780 A | 3/1998 | Carpenter et al. |
| 5,807,496 A | 9/1998 | Guerro |
| 5,846,384 A | 12/1998 | Schold et al. |
| 5,858,174 A | 1/1999 | Persson et al. |
| 6,083,404 A | 7/2000 | Sommese et al. |
| 6,132,625 A | 10/2000 | Moffett |

FOREIGN PATENT DOCUMENTS

| | | |
|---|---|---|
| EP | 0 471 408 A1 | 2/1992 |
| EP | 0 765 844 A1 | 4/1997 |
| JP | H08-322547 | 12/1996 |
| WO | WO 91/07350 A1 | 5/1991 |
| WO | WO 91/07351 A1 | 5/1991 |
| WO | WO 94/05595 A1 | 3/1994 |

OTHER PUBLICATIONS

G.D. Najafpour et al, Biological Conversion of Poultry Processing Waste to Single Cell Protein, Bioresource Technology, 48: 65–70, 1994.

Tiande Cai et al, Stabilization of Poultry Processing By–products and Poultry Carcasses Through Direct Chemical Acidification, Bioresource Technology, 52: 69–77, 1995.

* cited by examiner

Primary Examiner—Peter A. Hruskoci

(57) ABSTRACT

A process is provided which can be used to treat aqueous streams comprising soluble biomaterials, especially proteins, wherein the concentration of soluble biomaterials is substantially reduced. The process comprises adjusting the pH of a substantially aqueous to less than or equal to pH 3 to produce a first pH-adjusted stream, which is in turn adjusted to greater than pH 3 to produce a second pH-adjusted stream followed by addition of a flocculant to produce a flocculated material.

12 Claims, No Drawings

REMOVAL OF BIOMATERIALS FROM AQUEOUS STREAMS

BACKGROUND OF THE INVENTION

1. Field of the Invention

This invention relates to a process for treatment of substantially aqueous process streams, and more particularly to the removal of biomaterials from food processing operations, such as animal processing, especially poultry processing.

2. Description of the Related Art

Large amounts of biomaterials, both soluble and insoluble, such as proteins, carbohydrates, fats and oils, are collected in aqueous streams during food processing operations. These streams can be waste and wash waters from the slaughter of animals for food products and other food processing operations such as extraction of proteins during soybean processing, and the like. The aqueous stream must be treated to remove the biomaterials for recovery of valuable product or for discharge of the stream from the processing plant to a municipal or public water system. When separated and dried, the biomaterials have value, for example, as animal feed, crop fertilizers, in pharmaceuticals and in personal care products. In one particular example, recovered protein from soybeans may be used in infant formula.

Techniques for removal of proteins, carbohydrates, fats and oils, and other biological contaminants from aqueous food processing streams are known. A common practice is to separate the protein, fats and oils from the aqueous stream by flocculation with metal salts, especially iron and/or aluminum salts, and anionic polymers. As it is common to use the recovered proteins, carbohydrates, fats and oils in animal feed, there are health issues when metal salts are used to separate biomaterials. There is concern that the recovered biomaterials have high levels of metal salts, which may build up in the tissues of the animals to which the feed is given, these tissues being subsequently consumed by humans. Animal nutritionists are also concerned that metal salts may bind to phosphates in the feed so that they are less available as a nutrient. The food processing industry has sought alternatives to the use of metal salts for separation of proteins, carbohydrates, fats, and oils from aqueous streams.

An improved process to treat aqueous streams comprising biosolids is disclosed in U.S. Pat. No. 6,132,625. Therein, a combination of an inorganic anionic colloid combined with a cationic polymer removes biosolids from aqueous streams. While this process is highly effective for removing biosolids, there can remain an undesirably high amount of soluble biomaterials in the stream. For value as a feed, fertilizer, in pharmaceuticals or personal care products, in addition to limitations placed by public water systems on content of discharged water, it is desirable to remove greater amounts of soluble biomaterials. The present invention meets these needs.

SUMMARY OF THE INVENTION

The present invention provides a process that can be used in treatment of aqueous streams comprising soluble biomaterials, the process comprising in sequence, (1) adjusting the pH of a substantially aqueous stream comprising soluble biomaterials to less than or equal to pH 3 to produce a first pH-adjusted stream;

(2) adjusting the pH of the first pH-adjusted stream to greater than pH 3 to produce a second pH-adjusted stream; and adding an effective amount of a flocculant to the second pH-adjusted stream.

DETAILED DESCRIPTION

This invention process can be used for reducing the amount of soluble, insoluble, and/or dispersed biomaterials of a substantially aqueous stream, whereby the biomaterials are flocculated, and optionally separated for subsequent use, for example, in animal feeds. The term "stream" is interchangeable herein with "fluid", which can be in a moving or still form in a container, vessel, or processing equipment. The process comprises adjusting the pH of a substantially aqueous to less than or equal to pH 3 to produce a first pH-adjusted stream. The pH of the first pH-adjusted stream is adjusted to greater than pH 3 to produce a second pH-adjusted stream. An effective amount of a flocculent is added to the second pH-adjusted stream to produce a flocculated material.

As defined herein, to flocculate means to separate both soluble materials and insoluble suspended biomaterials, from a stream comprising biomaterials wherein the biomaterials become aggregated. Flocculation produces a flocculated material, which, if desired, can be physically separated from the stream. In the present invention, it is desirable to maximize the size of the flocculated material in order to facilitate removal of this material from the stream.

Materials

Aqueous Stream

In the process of this invention, the aqueous stream to be treated can be from any processing plant that produces an aqueous stream comprising soluble biomaterials, such as food processing plants. The aqueous stream can also contain biosolids, which can be recovered along with the soluble biomaterials in the process of this invention. The aqueous stream can also contain dispersed biomaterials such as fats or oils. For example, animal slaughterhouses and animal processing plants and other food processing plants may produce aqueous streams comprising soluble proteins, fats and oil. Animal slaughterhouses and processing plants include those for cattle, hogs, poultry and seafood. Other food processing plants include plants for vegetable, grain and dairy food processing, for example, plants for processing soybeans, rice, barley, cheese, and whey; plants for wet-milling of starches and grains; as well as breweries, distilleries and wineries. For example in processing soybeans, proteins are extracted into an aqueous stream from which they are subsequently recovered. The present invention is especially useful for treating streams containing soluble proteins from animal processing.

This invention is also useful in treatment of aqueous suspensions containing soluble biomaterials derived from processing of food (animal or vegetable) materials, which may have non-food end uses. For example, when separated and recovered, proteins are useful in certain cosmetics and other skin care formulations; starch has numerous non-food uses, including use in paper manufacture. Further still, this invention is useful to treat in general, any aqueous stream comprising soluble biomaterials, which may result from non-food processing operations.

pH Adjustment

The pH of an aqueous stream comprising soluble biomaterials is typically above pH 3, more typically above pH 6. Therefore an acid or other reagent that can effectively reduce pH to less than or equal to pH 3 is first added. Though any acids or reagents that can effective reduce the pH can be used, mineral acids such as sulfuric acid, hydrochloric acid, nitric acid, and mixtures thereof are preferred. Other useful acids or reagents to reduce pH to less than or equal to 3 include, but are not limited to, sulfonic acids, and organic acids such as carboxylic acids, acrylic acids, partially neutralized acids in which one or more protons are replaced with a metal or ammonium ion such as ammonium sulfate, and mixtures thereof. Acid metal salts can also be used to reduce pH to less than or equal to pH 3.

For adjustment to pH greater than pH 3, any suitable additive capable of increasing pH to greater than pH 3 can be used. Typically a base is used, preferably sodium hydroxide or lime because of cost and availability.

Flocculant

Flocculants useful in the process of this invention include organic polymers, optionally in the presence of an anionic inorganic colloid and/or a metal salt, such that the concentration of biomaterials, in particular soluble biomaterials in the aqueous stream is effectively reduced. The polymer can be a cationic organic polymer, amphoteric organic polymer, anionic organic polymer, or mixtures thereof. Low or high molecular weight organic polymers, or mixtures thereof can be used.

High molecular weight cationic organic polymers will typically have a number average molecular weight greater than 1,000,000. These polymers include cationic starch, cationic guar gum, chitosan and high molecular weight synthetic cationic polymers such as cationic polyacrylamide. Cationic starches include those formed by reacting starch with a tertiary or quaternary amine to provide cationic products with a degree of substitution of from 0.01 to 1.0, containing from about 0.01 to 1.0 wt % nitrogen. Suitable starches include potato, corn, waxy maize, wheat, rice and oat.

Useful low molecular weight cationic polymers have a number average molecular weight in the range between about 2,000 to about 1,000,000, preferably between 10,000 and 500,000. The low molecular weight polymer can be for example, polyethylene imine, polyamines, polycyandiamide formaldehyde polymers, amphoteric polymers, diallyl dimethyl ammonium chloride polymers, diallylaminoalkyl (meth)acrylate polymers and dialkylaminoalkyl (meth) acrylamide polymers, a copolymer of acrylamide and diallyl dimethyl ammonium chloride, a copolymer of acrylamide and diallylaminoalkyl (meth)acrylates, a copolymer of acrylamide and dialkyldiaminoalkyl (meth)acrylamides, and a polymer of dimethylamine and epichlorohydrin. These have been described in U.S. Pat. Nos. 4,795,531 and 5,126,014.

Amphoteric polymers useful as flocculants in this invention include amphoteric starch, guar gum and synthetic amphoteric high molecular weight organic polymers.

Anionic polymers that can be used in the process of this invention have a number average molecular weight of at least 500,000 and a degree of anionic substitution of at least 1 mol %. Anionic polymers with number average molecular weights of greater than 1,000,000 are preferred. Preferably the degree of anionic substitution is 10–70 mol %. Examples of useful anionic polymers include water soluble vinylic polymers containing acrylamide, acrylic acid, acrylamido-2-methylpropylsulfonate and/or mixtures thereof, and can also be either hydrolyzed acrylamide polymers or copolymers of acrylamide or a homolog, such as methacrylamide, with acrylic acid or a homolog, such as methacrylic acid, or even with monomers such as maleic acid, itaconic acid, vinyl sulfonic acid, acrylamido-2-methylpropylsulfonate, and other sulfonate containing monomers. Anionic polymers are further described in U.S. Pat. Nos. 4,643,801; 4,795,531; and 5,126,014. Other anionic polymers that can be used include anionic starch, anionic guar gum and anionic polyvinyl acetate.

The flocculant is used in an effective amount, to produce remove soluble biomaterials from the aqueous stream to produce a flocculated material. An effective amount can be determined by means available and known to those skilled in the art, using techniques such as colloidal titration. Generally this amount will be in the range of from about 0.01 to about 10,000 ppm of polymer, based on total weight of the stream. Preferably the effective amount of flocculant ranges from about 0.2 to 5000 ppm based on the solution weight of the aqueous stream. The more preferred range is from about 1 to 2500 ppm.

Optional Components

Anionic Inorganic Colloid

Anionic inorganic colloids can include silica-based and non-silica-based anionic inorganic colloids and mixtures thereof. Silica-based anionic inorganic colloids include, but are not limited to, colloidal silica, aluminum-modified colloidal silica, polysilicate microgels, polyaluminosilicate microgels, polysilicic acid, and polysilicic acid microgels, and mixtures thereof. Non-silica-based anionic inorganic colloids include clays, especially colloidal bentonite clay. Other non-silica-based anionic inorganic colloids include colloidal tin and titanyl sulfate.

The anionic inorganic colloids used in this invention can be in the form of a colloidal silica sol containing about 2 to 60% by weight of $SiO_2$, preferably about 4 to 30% by weight of $SiO_2$. The colloid can have particles with at least a surface layer of aluminum silicate or it can be an aluminum modified silica sol. The colloidal silica particles in the sols commonly have a specific surface area of 50–1000 $m^2/g$, more preferably about 200–1000 $m^2/g$, and most preferably a specific surface area of about 300–700 $m^2/g$. The silica sol can be stabilized with alkali in a molar ratio of $SiO_2:M_2O$ of from 10:1 to 300:1, preferably 15:1 to 100:1 (M is Na, K, Li, and $NH_4$). The colloidal particles have a particle size of less than 60 nm, with an average particle size less than 20 nm, and most preferably with an average particle size of from about 1 nm to 10 nm.

Microgels are distinct from colloidal silica in that the microgel particles usually have surface areas of 1000 $m^2/g$ or higher and the microgels are comprised of small 1–2 nm diameter silica particles linked together into chains and three-dimensional networks. Polysilicate microgels, also known as active silicas, have $SiO_2:Na_2O$ ratios of 4:1 to about 25:1, and are discussed on pages 174–176 and 225–234 of "The Chemistry of Silica" by Ralph K. Iler, published by John Wiley and Sons, N.Y., 1979. Polysilicic acid generally refers to those silicic acids that have been formed and partially polymerized in the pH range 1–4 and comprise silica particles generally smaller than 4 nm diameter, which thereafter polymerize into chains and three-dimensional networks. Polysilicic acid can be prepared in accordance with the methods disclosed in U.S. Pat. Nos. 5,127,994 and 5,626,721, incorporated herein by reference. Polyaluminosilicates are polysilicate or polysilicic acid microgels in which aluminum has been incorporated within the particles, on the surface of the particles, or both. Polysilicate microgels, polyaluminosilicate microgels and polysilicic acid can be prepared and stabilized at acidic pH. Better results have been generally found to occur with larger microgel sizes; generally greater than 10 nm size microgels give the best performance. Microgel size can be increased by any of the known methods such as of aging of the microgel, changing pH, changing concentrations, or other methods, known to those skilled in the art.

The polysilicate microgels and polyaluminosilicate microgels useful in this invention are commonly formed by the activation of an alkali metal silicate under conditions described in U.S. Pat. Nos. 4,954,220 and 4,927,498, incorporated herein by reference. A preferred process for preparing silica microgels is disclosed in U.S. Pat. No. 6,060,523, incorporated herein by reference. However, other methods can also be employed. For example, polyaluminosilicates can be formed by the acidification of silicate with mineral acids containing dissolved aluminum salts as described in U.S. Pat. No. 5,482,693, incorporated herein by reference. Alumina/silica microgels can be formed by the acidification of silicate with an excess of alum, as described in U.S. Pat. No. 2,234,285, incorporated herein by reference.

In addition to conventional silica sols and silica microgels, silica sols such as those described in European patents EP 491879 and EP 502089, incorporated herein by reference, can also be used for the anionic inorganic colloid in this invention.

The anionic inorganic colloids when used, are used in an effective amount, together with flocculant, to flocculate the soluble biomaterials. Preferably an anionic inorganic colloid is used in combination with the flocculant to improve COD removal. An effective amount can range from about 1 to 7500 parts per million (ppm) by weight as solids, e.g., as $SiO_2$, based on the solution weight of the aqueous stream. The preferred range is from about 1 to 5000 ppm, depending on the anionic inorganic colloid. Preferred ranges for selected anionic inorganic colloids are 2 to 500 ppm for polysilicic acid or polysilicate microgels; 4 to 1000 ppm for colloidal silica, and 2 to 2000 ppm for inorganic colloidal clays, such as bentonite.

Metal Salts

Optionally metal salts can be used in the process of this invention. Iron and aluminum are particularly useful. Acidic metal salts can be used to reduce pH and act as a charge donor.

Process

The process of this invention involves treatment of an aqueous stream containing soluble biomaterials, for example, proteins, to reduce the concentration of soluble biomaterials in the stream (as measured by COD) by flocculation and optionally to separate the flocculated materials. These materials can be recovered for subsequent use. This process captures both soluble materials as well as suspended biosolids.

The process of this invention involves treating an aqueous stream comprising soluble biomaterials by adjusting the pH of the stream to produce a first pH-adjusted stream having a pH of less than or equal to pH 3, preferably less than or equal to pH 2.5. This is typically done as disclosed above.

The pH of the first pH-adjusted stream is then adjusted to produce a second pH-adjusted stream having a pH greater than 3, preferably greater than or equal to pH 4. This is typically done with a base as disclosed above.

A flocculent is then added in an amount effective to produce flocculation of the biomaterials. Both soluble and insoluble materials are flocculated.

The preferred flocculant will depend on the composition of the stream comprising biomaterials. Generally, high molecular weight organic polymers, that is, having a number average molecular weight greater than 1,000,000, are preferred. The preferred organic polymer is a polyacrylamide. The preferred flocculant will also depend on whether any optional components are added. When an anionic inorganic colloid is added, preferably the flocculant is a cationic polymer. When a metal salt, in particular, ferric chloride, is added, preferably the flocculant is an anionic polymer.

For efficiency purposes, it is preferred to carry out the steps in succession, with minimal time between steps. However, longer time intervals between steps are not detrimental to the process and, in some cases, can improve results and are not precluded from the scope of this invention. Generally, there is no need to have a specific time interval between the steps, so long as the steps occur in succession as opposed to simultaneously.

When adding the optional components, anionic inorganic colloid or metal salt, they can be added at any time during the process, that is before first pH adjustment, between first and second pH adjustment or after addition of the flocculant. Generally the amount of inorganic colloid or metal salt is not sufficient to substantially change the pH. Preferably the optional components are added after pH adjustments.

The flocculated biomaterials can optionally be separated from the treated stream by conventional separation processes such as sedimentation, flotation, filtering, centrifugation, decantation, or combinations of such processes. The separated biomaterials can subsequently be recovered and used in numerous applications.

EXAMPLES

Example 1

An aqueous stream containing wastewater from a turkey processing plant was treated by adjusting the pH with sulfuric acid (first pH) and sodium hydroxide (second pH) as necessary. After pH adjustment, 120 ppm $SiO_2$ as silica microgel (Particlear® MX, available from E. I. du Pont de Nemours and Company, Inc., Wilmington, Del.) was added followed 15 seconds later by addition of 10 ppm cationic polyacrylamide (Percol 7650, available from Ciba Specialty Chemicals, Basel, Switzerland). Mixing was stopped 30 seconds after the addition of the cationic polymer. Chemical oxygen demand (COD) of the wastewater was measured 1 minute after the mixing was stopped.

TABLE 1

| Run | First pH adjustment | Second pH adjustment | COD, ppm |
| --- | --- | --- | --- |
| 1 | 5 | — | 475 |
| 2 | 4 | — | 540 |
| 3 | 3.5 | — | 557 |
| 4 | 3 | — | 628 |
| 5 | 2 | 5 | 358 |

By visual inspection, almost all of the solids were removed by the treatments using a single pH adjustment. The increased reduction in COD seen in Table 1, when pH was first adjusted to a pH of less than 3, followed by adjustment to a pH greater than 3, reflected primarily a decrease of soluble biomaterials in the wastewater when a combination of an anionic inorganic colloid and a cationic polymer was used.

Example 2

Wastewater from a turkey processing plant was treated by adjusting the pH with sulfuric acid (first pH) and sodium hydroxide (second pH) as necessary. After pH adjustments, cationic polyacrylamide (Hychem CP913HH, available from Hychem, Tampa, Fla.) was added to the wastewater at a sufficient level to produce good flocculation. Mixing was stopped 30 seconds after the addition of the polyacrylamide. COD of the wastewater was measured 1 minute after the mixing was stopped.

TABLE 2

| Run | Hychem CP913HH, ppm | First pH adjustment | Second pH adjustment | COD, ppm |
| --- | --- | --- | --- | --- |
| 6 | 16 | 5 | — | 1094 |
| 7 | 16 | 4 | — | 1334 |
| 8 | 8 | 2 | 5 | 879 |

By visual inspection, almost all of the solids were removed by the treatments using a single pH adjustment. The increased reduction in COD seen in Table 2, when pH was first adjusted to a pH of less than 3, followed by adjustment to a pH greater than 3, reflected primarily a decrease of soluble biomaterials in the wastewater when using only a cationic polymer. Surprisingly, enhanced reduction in COD was observed using half as much polymer when the two pH adjustments were made.

Example 3

A solution containing 1000 ppm of albumin was prepared. COD of the solution was found to be 1153 after filtration through Whatman 934AH filter paper. The pH of the solution was lowered to pH 2 using sulfuric acid. After the reaction times shown in Table 3, the pH was raised to pH 5 with NaOH. After pH adjustment, 80 ppm of SiO2 as Particlear® MX was added followed by 15 seconds later the addition of 10 ppm of a high molecular weight anionic polyacrylamide (Magnifloc 135 available from Cytec, West Paterson, N.J.). After 30 seconds of stirring, the solution was filtered to remove any solids and COD of the filtrate was measured. Comparative examples were also run with adjustment of the pH of the albumin solution to pH 5 for specified periods of time.

TABLE 4

| Run | First pH adjustment | Second pH adjustment | Soluble COD, ppm |
|---|---|---|---|
| 17 | 4.8 | — | 281 |
| 18 | 4.3 | — | 308 |
| 19 | 3.3 | — | 321 |
| 20 | 2.8 | — | 395 |
| 21 | 3 | 4.8 | 220 |
| 22 | 2.5 | 4.8 | 237 |
| 23 | 2 | 4.8 | 204 |

Since solids were removed by filtration, the increased reduction in COD seen in Table 3 reflected a decrease in soluble biomaterials from a solution of albumin when pH was first adjusted to a pH of less than 3, followed by adjustment to a pH greater than 3, when a combination of an anionic inorganic colloid and an anionic polymer was used. Table 3 further shows that short or long reaction time at pH less than or equal to 3 produced improvement in reduction of COD.

Example 4

To 4500 g of wastewater from an Eastern shore chicken processing plant, was added 5 g of chicken blood (from the same facility). Soluble COD was measured at 511 ppm. The wastewater was treated by adjusted pH as shown in Table 4, adding 80 ppm SiO2 as Particlear® MX, 10 ppm Percol 7650 cationic polyacrylamide, and 4 ppm Magnifloc 135 anionic polyacrylamide. Flocculated wastewater was filtered and COD was determined.

TABLE 3

| Run | First pH adjustment | Reaction time, minutes | Second pH adjustment | COD, ppm |
|---|---|---|---|---|
| 9 | 2 | 0 | 5 | 724 |
| 10 | 2 | 1 | 5 | 671 |
| 11 | 2 | 5 | 5 | 704 |
| 12 | 2 | 15 | 5 | 689 |
| 13 | 5 | 0 | — | 747 |
| 14 | 5 | 1 | — | 733 |
| 15 | 5 | 5 | — | 758 |
| 16 | 5 | 15 | — | 743 |

Since solids were removed by filtration, the increased reduction in COD seen in Table 4 reflected a decrease in soluble biomaterials from a wastewater stream containing chicken blood when pH was first adjusted to a pH of less than 3, followed by adjustment to a pH greater than 3, when a combination of an anionic inorganic colloid, a cationic polymer and an anionic polymer was used.

The above examples show that it is especially surprising that this sequential pH adjustment enhances removal of soluble biomaterials from aqueous streams upon addition of a flocculent, as treatment at such low pH was considered to be detrimental.

What is claimed is:

1. A process for reducing biomaterials and COD in a substantially aqueous stream comprising in sequence (1) adjusting the pH of said stream to a first pH of less than pH 3 to produce a first pH-adjusted stream; (2) adjusting the pH of the first pH-adjusted stream to a second pH greater than pH 3 to produce a second pH-adjusted stream; and (3) adding an effective amount of a cationic polyacrylamide to the second pH-adjusted stream to produce a flocculated biomaterials and separating said flocculated biomaterials from said stream to reduce said COD.

2. The process of claim 1 wherein an anionic inorganic colloid or metal salt is added to the second pH-adjusted stream.

3. The process of claim 2 wherein the aqueous stream comprises soluble proteins.

4. The process of claim 3 wherein the first pH is less than or equal to 2.

5. The process of claim 4 wherein the second pH is greater than or equal to 4.

6. The process of claim 2 wherein the first PH is less than or equal to 2.

7. The process of claim 6 wherein the second pH is greater than or equal to 4.

8. The process of claim 2 wherein the second pH is greater than or equal to 4.

9. The process of claim 1 wherein the aqueous stream comprises soluble proteins.

10. The process of claim 9 wherein the first pH is less than or equal to 2.

11. The process of claim 10 wherein the second pH is greater than or equal to 4.

12. A process for reducing biomaterials and COD in a substantially aqueous stream comprising in sequence (1) adjusting the pH of-said stream to a first pH of less than pH 3 to produce a first pH-adjusted stream; (2) adjusting the pH of the first pH-adjusted stream to a second pH greater than or equal to pH 4 to produce a second pH-adjusted stream; and (3) adding an effective amount of cationic polyacrylamide to the second pH-adjusted stream to produce a flocculated biomaterials and separating said flocculated biomaterials to reduce said COD.

* * * * *